April 20, 1954
L. DINGES
2,676,056
WEATHER PROTECTIVE HOOD FOR VEHICLES
Filed April 13, 1951
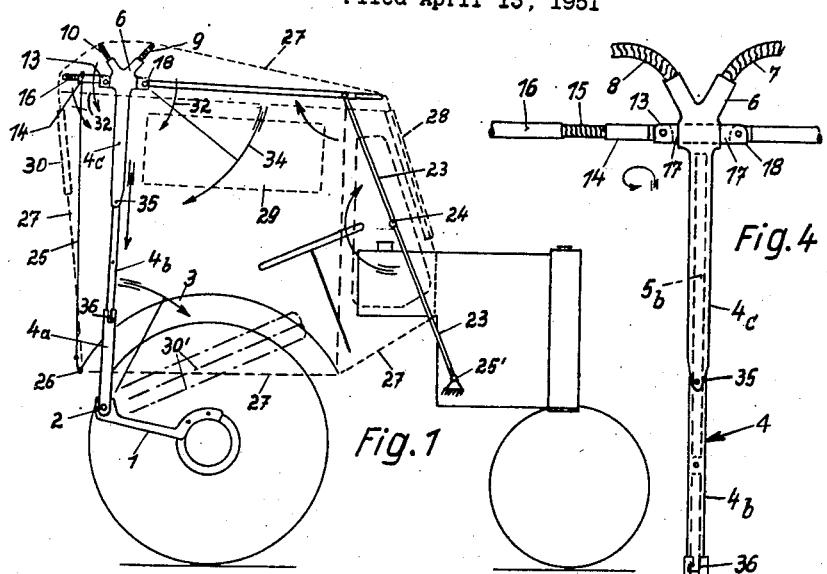
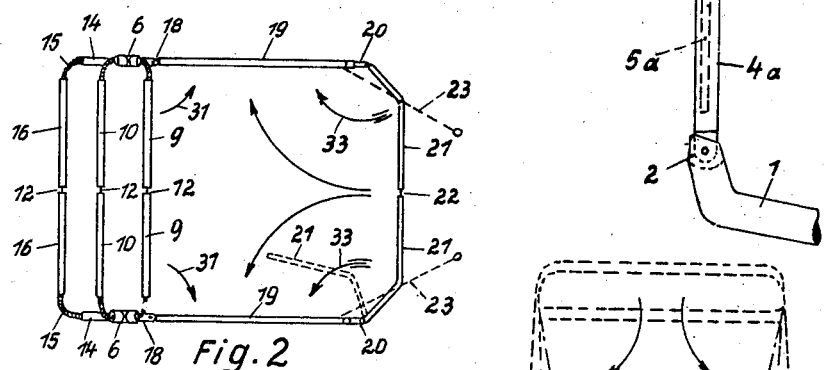
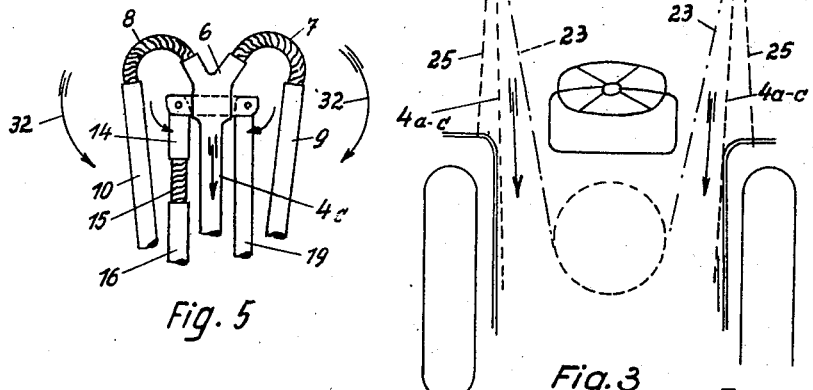
Inventor:
L. Dinges Patented Apr. 20, 1954

2,676,056

UNITED STATES PATENT OFFICE 2,676,056

WEATHER PROTECTIVE HOOD FOR VEHICLES

Lorenz Dinges, Oberursel on the Taunus, Germany

Application April 13, 1951, Serial No. 220,787

Claims priority, application Germany April 26, 1950

6 Claims. (Cl. 296—107)

This invention relates to weather protective hoods for vehicles and particularly to such as are used on traction vehicles, commonly called tractors, for agricultural and other purposes, and it mainly consists in the provision, in vehicles of the said kind, of a collapsible or foldable weather protective hood which may be unobtrusively carried on the vehicle when not in use but which may be put up in a very short space of time to provide for weather protection whenever required.

The customary hoods which are used on vehicles of the said kind have the disadvantage that they are permanently mounted to the car. Their frame members, comprising stays, bars, rods or struts and ties are all rigidly connected to one another. The entire frame of such hoods, therefore, forms a rigid, non-foldable structure which cannot be carried on the vehicle in an out-of-the-way state or arrangement.

The subject matter of the invention, as contrasted with this known kind of hood, is a weather protective hood, the frame of which is pivotally joined to the body of the vehicle, to which it can be secured in folded condition in readiness for being unfolded without requiring any particular skill or the employment of special tools therefor.

In accordance with the invention, the frame of the improved hood comprises two resiliently telescoped posts, each having a bifurcated head piece with spiral springs extending from the prongs thereof, to which the spars for the lateral support of the hood proper are attached. In addition to these spars there is provision on the head pieces to also carry other members of the general frame structure.

At its forward end the frame of the hood is made to continue into the front cross bar which is foldably attached to the longitudinal side spars thereof. The said front cross bar as also all other cross bars are made to extend only as far as to about the median longitudinal line of the vehicle, so that the entire frame consists of two halves, one right and one left. At their centers the said cross bars, or their halves respectively, abut against one another and are joined there by quickly disconnectible means.

The lower ends of the said posts, of which there is one at the right hand and one at the left hand side of the car, are pivoted to carrying brackets fastened to the hub casings of the rear wheels for example. By means of this connection the two halves of the frame in their folded condition can be swung in alongside the mudguards of the wheels, so that the entire frame is located out of the driver's way when the hood is not in use. The awning, forming the hood proper, can be folded together and stowed away under the driver's seat or elsewhere.

In its unfolded, operative condition the frame is carried mainly by the aforementioned two posts. Laterally of the front cross bar a further support is provided by two tie rods, also made in halves, resiliently and disconnectibly pivoted at their lower ends to the fore part of the vehicle, as to the motor casing for instance. This practically bipartite carrying frame is held together by the tension of the awning when placed over it and which prevents the cross bars coming apart.

Owing to the various stays and spars being carried on the forked head pieces of the said posts by the interposition of springs, round corners are produced which protect the hood awning against the ill effects of the vibrations of the frame due to the irregularities of the track. The resiliency of the main posts naturally acts in the same direction, thereby tending to increase the duration of life of the hood. Apart from this advantage the said springs serve the additional purpose of enabling the cross bars being folded directly alongside the posts and the other frame members, in order to be able to thus tightly pack the frame, and to swing it into its position of rest out of the driver's way.

The accompanying sheet of drawings illustrates the invention largely diagrammatic by way of example. In these drawings:

Fig. 1 is a side elevation of the frame in accordance with the invention as applied to a tractor.

Fig. 2 shows the frame in plan view.

Fig. 3 is a rear view of Fig. 1.

Fig. 4 illustrates one of the main posts, and

Fig. 5 the bifurcated cross head with its adjoining parts in their folded-up condition.

In accordance with the example shown in these drawings the bracket 1 at each side of the vehicle is bolted or otherwise fixed to the hub casing of the rear wheel. To this free end of the said bracket the post 4 is hingedly attached at 2 so as to be foldable in the direction indicated by the arrow 3. Each of the posts consists of tube sections 4a, 4b, and 4c which are telescopically joined to one another. Springs 5a and 5b are provided in the central section 4b, which resiliently hold the tripartite post in its extended position when in use. The upper tubular portion 4c of the post is provided with the forked cross head 6, into the prongs of which helical springs, or simply wound wires 7 and 8 are inserted, to which the cross bars 9 and 10 are attached so as to extend from both sides of the frame to about the median line of the car where they are held together by socket pins 12.

In the head 6 a bolt 17 is turnably arranged. This bolt is provided with slotted ends into one of which a short sleeve 14 is hinged by means of a bolt 13, to which is attached a spring 15 carrying the cross bar 16. In a similar manner and hinged at 18 to the other, forward end of the slotted bolt 17 is the longitudinal spar 19, which extends to the forward end of the frame where it is pivotally connected, at 20, with the respective half of the front cross bar 21 which, in turn, is connected to its opposite half 21 by means of the socket pin 22. Close to the connecting point 20 of the members 19 and 21 a tie rod 23 is pivotally connected to the frame, which consists of two parts joined to each other at 24. The lower half of this tie is disconnectingly attached, at 25', to the motor casing or any other convenient part of the vehicle. At the rear of the frame a strap 25 connects the sleeve 14 at each side of the frame to a fixed point 26, at the mudguard for instance, of the vehicle which thus tensions the frame at the back thereof.

In Fig. 1 the dotted lines indicate the position of the awning which is stretched over the frame to form the hood proper. Windows 28, 29, and 30 of transparent material are inserted in corresponding openings after the hood has been attached. They may, of course, be permanently applied to the hood if this should be found more convenient.

The arrows which are shown in the various figures are intended to explain the way the frame is to be folded. In its collapsed condition each half of the frame is located and fastened at its respective side of the car close to the mudguards of the rear wheels as indicated by the dot and dash lines 30' in Fig. 1.

The folding of the frame preferably takes place in the following order: After the hood or awning has been taken off the cross bars 9, 10, 16, and 21, these are loosened by pulling the sockets 12 and 22 apart. The bars 9, 10, and 16 are then turned in and downwardly as indicated by the arrows 31 and 32, which is rendered possible by the provision of the springs 7, 8, and 15, whereupon they are pressed against the posts 4. Simultaneously therewith the members 19 and 16 are also turned downwardly on their hinges 18 so as also to lie close to the posts 4, while the front cross bar 21 is swung with its respective halves about their joints 20 as indicated by the dotted lines and the arrow 33 in Fig. 2. The whole arrangement of the members 16, 19, and 20 is swung down about the pins 13 and 18 into the position shown in Fig. 5. All the various members 9, 10, 16, and 19, the latter including the front cross bar 21, are now dangling from the head 6 of the post 4 and are then tied to the posts 4 by means of the straps 25 which are now also freely suspended from the frame. Eventually the tubular post sections 4a and 4c are pushed together against the action of the springs 5a and 5b over the central section 4c and secured in this position by the pin 35 taking into the bayonet slot 36.

In this collapsed or folded state both, the right and left frame packets are swung about their joints 2 into the position indicated, as aforesaid, by the dot and dash lines 30 in Fig. 1 so as to be out of the way of the driver. This having been done the vehicle is completely free from its hood. If the hood is required, it is unfolded in the reversed way to that just described.

What I claim and desire to secure by Letters Patent of the United States is:

1. In a weather protective hood for a tractor, a frame and an awning carried by said frame, said frame consisting of two parts each located at one side of the tractor and comprising, a carrying post member consisting of telescopic tube members, resilient means in connection with said tube members, a head piece on the uppermost of said tube members, short helical springs emanating from said head piece, cross bar halves attached to said springs, a slotted bolt turnably carried by said head piece, longitudinal spars pivotally secured in the slotted ends of said bolt and carrying halves of the front and end cross bars, and means for detachably connecting the mutually opposite halves of said cross bars at substantially the median line of the tractor.

2. In a weather protective hood for use on a tractor, a frame comprising longitudinally and crosswisely disposed members for supporting an awning, said frame consisting of two halves, one on each side of the tractor, a carrying post in each of said halves comprising a lower tubular section pivotally connected to a point near the rear wheel of the tractor at the respective side thereof, a top tubular section, a forked head piece on said top section, means on said head piece for carrying length and cross frame members, a central tubular section on said carrying post, springs in said central section extending into said upper and lower tubular sections, and fastening means for locking said outside sections over the central section when the said carrying post has been collapsed against the action of said springs.

3. A weather protective hood for use on a tractor, comprising a frame consisting of two halves and having length and cross members for the support of an awning, a telescopic carrying post in the said frame at each side of the tractor, a forked head on said carrying post, universally flexing means extending from the prongs of said forked head, cross bar halves connected to the free ends of said flexing means, a slotted bolt on said forked head, longitudinal frame members pivotally carried in the slotted ends of said bolt, one of said frame members being a rear member and provided with a flexible joint to facilitate its bending around the rear corners of the tractor, another of said longitudinal frame members extending to the front of the tractor and also being provided with a flexible joint, a front cross bar attached with one of its ends to said longitudinal member, and a tie rod between said front cross bar and the tractor, all of said cross bars being divided into halves and provided with extricable joints for connecting corresponding halves to one another.

4. A foldable weather protective hood for tractors, comprising a frame which consists of two independent longitudinal sections, a carrying post in each section, halved cross bars in connection with said carrying posts, flexible means between said halved cross bars and said carrying post, said flexible means allowing of folding and turning said cross bars alongside of said carrying post at each side of the tractor so as to form a packet, straps between the rear of the frame and the back of the tractor for sustaining the frame when extended and for tying the frame packet when folded, and a pivotal connection for said carrying post on the tractor on which said frame packet can be turned into inoperative position on the tractor at a place remote from the driver's seat.

5. In a weather protective hood for vehicles, a frame for supporting an awning, said frame comprising, at each side of the vehicle, a telescopic carrying post, a forked head at the upper extremity of said carrying post, flexible members in the prongs of said forked head, bar-shaped members hinged to the said forked head and extending therefrom to the fore and aft of the vehicle, cross members mounted on said flexible members stretching across the vehicle to approximately the longitudinal median line thereof, and pivotal means on which to turn said posts to inoperative position alongside the vehicle.

6. A foldable weather protective hood for tractors comprising a frame which consists of two independent longitudinal parts, a telescopic carrying post in each part, a forked head piece on each of said carrying posts, helical springs mounted with one of their ends in the prongs of said forked head piece, cross bar halves attached to the free ends of said helical springs, means for connecting the cross bars of one side of the frame to the cross bars of the other side thereof, said helical springs serving as universal joints between said forked head and said cross bar halves for folding said cross bar halves alongside of said carrying post at either side of the tractor so as to enable the making of a packet of said post and cross bars, and a pivotal connection between the lower end of each of said carrying post and its respective side of the tractor which permits turning of said packet into inoperative position on the tractor.

References Cited in the file of this patent

UNITED STATES PATENTS

| Number | Name | Date |
|---|---|---|
| 381,945 | Mortz | May 1, 1888 |
| 725,722 | Kernodle | Apr. 21, 1903 |
| 886,222 | Koiner et al. | Apr. 28, 1908 |
| 1,305,515 | Bessolo | June 3, 1919 |
| 1,312,422 | Norton | Aug. 5, 1919 |